(12) United States Patent
Kumar et al.

(10) Patent No.: US 11,379,121 B2
(45) Date of Patent: Jul. 5, 2022

(54) GENERATING RECOMMENDATIONS FOR PROTECTION OPERATIONS PERFORMED FOR VIRTUAL STORAGE VOLUMES

(71) Applicant: EMC IP Holding Company LLC, Hopkinton, MA (US)

(72) Inventors: Sunil Kumar, Bangalore (IN); Prashant Pokharna, Ajmer (IN); Ashutosh Kumar Singh, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 59 days.

(21) Appl. No.: 17/020,060

(22) Filed: Sep. 14, 2020

(65) Prior Publication Data

US 2022/0083238 A1 Mar. 17, 2022

(51) Int. Cl.
G06F 3/06 (2006.01)
G06F 9/455 (2018.01)

(52) U.S. Cl.
CPC ............ G06F 3/0619 (2013.01); G06F 3/065 (2013.01); G06F 3/067 (2013.01); G06F 3/0664 (2013.01); G06F 9/45558 (2013.01); G06F 2009/45583 (2013.01)

(58) Field of Classification Search
None
See application file for complete search history.

(56) References Cited

U.S. PATENT DOCUMENTS

| 7,805,511 | B1* | 9/2010 | Panicker ................. G06F 11/30 709/224 |
| 9,185,188 | B1* | 11/2015 | Li ......................... G06F 3/0647 |
| 9,454,321 | B1* | 9/2016 | Smaldone .............. G06F 3/061 |
| 9,600,376 | B1* | 3/2017 | Krinke, II ........... G06F 11/1458 |
| 10,001,939 | B1* | 6/2018 | Gangadhar ......... G06F 11/3034 |
| 2010/0250748 | A1* | 9/2010 | Sivasubramanian ....................... G06F 21/6209 709/226 |

(Continued)

OTHER PUBLICATIONS (EMC VPLEX Geosynchrony Release 5.2 published 2013), pp. 288 (Year: 2013).*

(Continued)

Primary Examiner — Kaushikkumar M Patel
(74) Attorney, Agent, or Firm — Ryan, Mason & Lewis, LLP

(57) ABSTRACT

An apparatus comprises at least one processing device configured to identify a protection operation to be performed for a virtual storage volume, the virtual storage volume comprising two or more storage volumes on two or more storage systems, a first one of the storage volumes on a first one of the storage systems comprising data that is mirrored on a second one of the storage volumes on a second one of the storage systems different than the first storage system. The processing device is also configured to monitor parameters characterizing operation of the storage systems, to generate a recommendation of a given one of the first and second storage volumes to back up to a third storage volume based on the monitored parameters characterizing operation of the storage systems, and to perform the protection operation for the virtual storage volume based on the generated recommendation.

20 Claims, 12 Drawing Sheets

(56) References Cited

U.S. PATENT DOCUMENTS

| | | | |
|---|---|---|---|
| 2015/0193323 A1* | 7/2015 | Banerjee | G06F 11/3485 |
| | | | 702/182 |
| 2015/0324135 A1* | 11/2015 | Chan | G06F 3/0629 |
| | | | 711/114 |
| 2018/0081832 A1* | 3/2018 | Longo | G06F 11/3433 |
| 2018/0239644 A1* | 8/2018 | Uesaka | G06F 9/5077 |
| 2019/0340059 A1* | 11/2019 | Bagarolo | G06F 11/0772 |
| 2021/0405911 A1* | 12/2021 | Navon | G06K 9/6227 |

OTHER PUBLICATIONS

EMC Corporation, "EMC VPLEX," GeoSynchrony 5.1, Product Guide P/N 300-013-921-01, 2012, 128 pages.

DELL EMC, "Dell EMC VPLEX GeoSynchrony," Version 6.2, VPLEX Product Guide Rev. 01, 2019, 78 pages.

Dell Technologies, "Dell EMC VPLEX," Data Sheet, 2020, 3 pages.

Dell EMC, "Dell EMC VIPR Controller," Data Sheet, 2017, 2 pages.

Dell EMC, "Dell EMC Xtremio X2: Next-Generation All-Flash Array," Dell EMC, 2019, 5 pages.

Dell Technologies, "Dell EMC PowerStore," Data Sheet, 2020, 4 pages.

vmware.com, "Understanding Virtual Volumes (vVols) in VMware vSphere 6.7/7.0 (2113013)," https://kb.vmware.com/s/article/2113013, Apr. 2, 2020, 4 pages.

* cited by examiner

| VIEWER | TEXT | | |
|---|---|---|---|
| | | NAME ▲ | VALUE |
| {} JSON | | | |
| [ ] COUNTERS | | | |
| [ ] MEMBERS | | | |
| ■ 0: "TIMESTAMP" | | 0 | "TIMESTAMP" |
| ■ 1: "GUID" | | 1 | "GUID" |
| ■ 2: "NAME" | | 10 | "AVG_RD_IOPS" |
| ■ 3: "INDEX" | | 11 | "AVG_LOGICAL_SPACE_IN_USE" |
| ■ 4: "AVG_SMALL_RD_IOPS" | | 12 | "AVG_WR_IOPS" |
| ■ 5: "AVG_SMALL_WR_IOPS" | | 13 | "AVG_IOPS" |
| ■ 6: "AVG_REPLICATION_RD_BW_KBPS" | | 14 | "AVG_WR_LATENCY" |
| ■ 7: "AVG_REPLICATION_RD_16KB" | | 15 | "AVG_UNALIGNED_IO_RATIO" |
| ■ 8: "AVG_UNALIGNED_RD_IOPS" | | 16 | "AVG_SMALL_IO_RATIO" |
| ■ 9: "AVG_UNALIGNED_WR_IOPS" | | 17 | "AVG_QOS_EXCEEDED_IOPS" |
| ■ 10: "AVG_RD_IOPS" | | 18 | "AVG_SMALL_RD_BW" |
| ■ 11: "AVG_LOGICAL_SPACE_IN_USE" | | 19 | "AVG_REPLICATION_WR_BW_KBPS" |
| ■ 12: "AVG_WR_IOPS" | | 2 | "NAME" |
| ■ 13: "AVG_IOPS" | | 20 | "AVG_SMALL_WR_BW" |
| ■ 14: "AVG_WR_LATENCY" | | 21 | "AVG_SMALL_BW" |
| ■ 15: "AVG_UNALIGNED_IO_RATIO" | | 22 | "AVG_UNALIGNED_WR_BW" |
| ■ 16: "AVG_SMALL_IO_RATIO" | | 23 | "AVG_UNALIGNED_RD_BW" |
| ■ 17: "AVG_QOS_EXCEEDED_IOPS" | | 24 | "AVG_UNALIGNED_BW" |
| ■ 18: "AVG_SMALL_RD_BW" | | 25 | "AVG_BW" |
| ■ 19: "AVG_REPLICATION_WR_BW_KBPS" | | 26 | "AVG_SMALL_IOPS" |
| ■ 20: "AVG_SMALL_WR_BW" | | 27 | "AVG_WR_BW" |
| ■ 21: "AVG_SMALL_BW" | | 28 | "AVG_RD_BW" |
| ■ 22: "AVG_UNALIGNED_WR_BW" | | 29 | "AVG_AVG_LATENCY" |
| ■ 23: "AVG_UNALIGNED_RD_BW" | | 3 | "INDEX" |
| ■ 24: "AVG_UNALIGNED_BW" | | 4 | "AVG_SMALL_RD_IOPS" |
| ■ 25: "AVG_BW" | | 5 | "AVG_SMALL_WR_IOPS" |
| ■ 26: "AVG_SMALL_IOPS" | | 6 | "AVG_REPLICATION_RD_BW_KBPS" |
| ■ 27: "AVG_WR_BW" | | 7 | "AVG_REPLICATION_RD_16KB" |
| ■ 28: "AVG_RD_BW" | | 8 | "AVG_UNALIGNED_RD_IOPS" |
| ■ 29: "AVG_AVG_LATENCY" | | 9 | "AVG_UNALIGNED_WR_IOPS" |
| ■ 30: "AVG_QOS_EXCEEDED_BW" | | 30 | "AVG_QOS_EXCEEDED_BW" |
| ■ 31: "AVG_QOS_EFFECTIVE_BURST_BW" | | 31 | "AVG_QOS_EFFECTIVE_BURST_BW" |
| ■ 32: "AVG_QOS_EFFECTIVE_MAX_BW" | | 32 | "AVG_QOS_EFFECTIVE_MAX_BW" |
| ■ 33: "AVG_UNALIGNED_IOPS" | | 33 | "AVG_UNALIGNED_IOPS" |
| ■ 34: "AVG_RD_LATENCY" | | 34 | "AVG_RD_LATENCY" |
| ■ 35: "AVG_REPLICATION_WR_IOPS_16KB" | | 35 | "AVG_REPLICATION_WR_IOPS_16KB" |
| [ ] LINKS | | | |
| ■ GRANULARITY: "ONE_HOUR" | | | |

GENERATING RECOMMENDATIONS FOR PROTECTION OPERATIONS PERFORMED FOR VIRTUAL STORAGE VOLUMES

FIELD

The field relates generally to information processing, and more particularly to storage in information processing systems.

BACKGROUND

Virtual storage technology may be used to enable federation of data located on multiple storage systems, including storage systems in different data centers or different geographic locations. In some cases, virtual storage technology is used to pool resources from multiple storage systems together to create virtual storage volumes. To provide redundancy in the case of planned and unplanned storage system outages, virtual storage technology may mirror data of a virtual storage volume among multiple storage volumes on different storage systems. Thus, if the storage system providing one such storage volume experiences an outage, the virtual storage technology can continue processing of input-output operations using another storage system providing a storage volume with mirrored data.

SUMMARY

Illustrative embodiments of the present invention provide techniques for generating recommendations for protection operations performed for virtual storage volumes.

In one embodiment, an apparatus comprises at least one processing device comprising a processor coupled to a memory. The at least one processing device is configured to perform the step of identifying a protection operation to be performed for a virtual storage volume, the virtual storage volume comprising two or more storage volumes on two or more storage systems, a first one of the two or more storage volumes on a first one of the two or more storage systems comprising data that is mirrored on a second one of the two or more storage volumes on a second one of the two or more storage systems different than the first storage system. The at least one processing device is also configured to perform the steps of monitoring one or more parameters characterizing operation of the two or more storage systems, generating a recommendation of a given one of the first and second storage volumes to back up to a third storage volume based at least in part on the monitored one or more parameters characterizing operation of the two or more storage systems, and performing the protection operation for the virtual storage volume based at least in part on the generated recommendation.

These and other illustrative embodiments include, without limitation, methods, apparatus, networks, systems and processor-readable storage media.

BRIEF DESCRIPTION OF THE DRAWINGS

FIG. 9 shows an example of monitoring information for a storage system in an illustrative embodiment.

FIG. 10 shows another example of monitoring information for a storage system in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
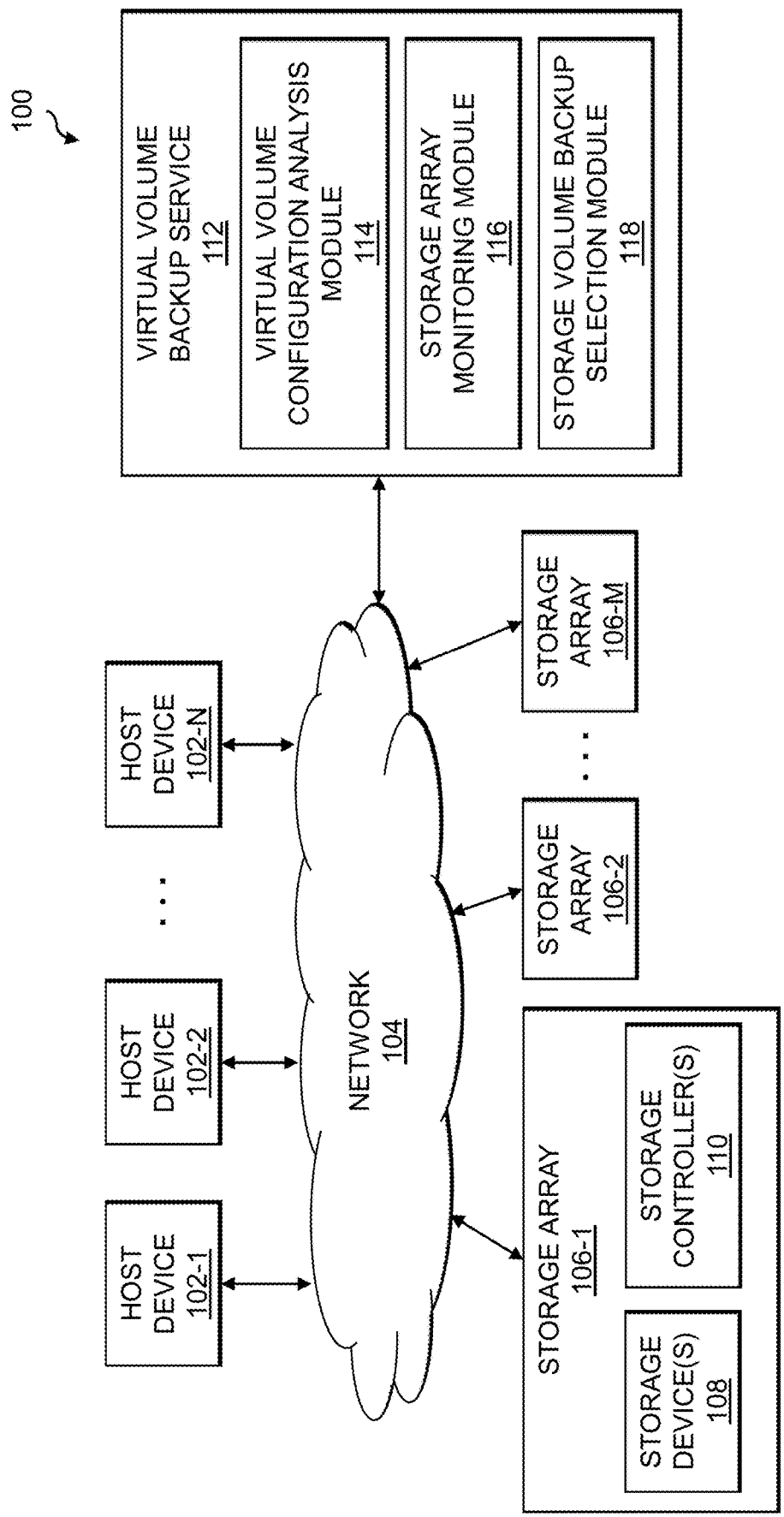
FIG. 1 is a block diagram of an information processing system for generating recommendations for protection operations performed for virtual storage volumes in an illustrative embodiment of the invention.

FIG. 1 shows an information processing system 100 configured in accordance with an illustrative embodiment to generate recommendations for protection operations performed for virtual storage volumes, such as generating recommendations for particular ones of mirrored storage volumes to back up as part of the protection operations based on monitoring operation of the underlying storage systems providing such storage systems. The information processing system 100 comprises one or more host devices 102-1, 102-2, . . . 102-N (collectively, host devices 102) that communicate over a network 104 with one or more storage arrays 106-1, 106-2, . . . 106-M (collectively, storage arrays 106). The network 104 may comprise a storage area network (SAN).

The storage array 106-1, as shown in FIG. 1, comprises a plurality of storage devices 108 each storing data utilized by one or more applications running on the host devices 102. The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 illustratively comprise respective computers, servers or other types of processing devices capable of communicating with the storage arrays 106 via the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102. These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

In the information processing system 100 of FIG. 1, the host devices 102 are assumed to access one or more virtual volumes provided by the storage arrays 106. Storage volumes provided by the storage devices of one or more of the storage arrays 106 may be grouped to provide one or more virtual volumes that are accessed by the host devices 102. A given virtual volume, for example, may include data that is mirrored on two different storage volumes provided by two different ones of the storage arrays 106. The information processing system 100 further includes a virtual volume backup service 112 that is configured to provide functionality for selecting which mirrored storage volume to protect during a backup operation for the given virtual volume.

The virtual volume backup service 112 includes a virtual volume configuration analysis module 114 configured to analyze the given virtual volume to determine the underlying storage volumes of the storage arrays 106 providing the given virtual volume. The virtual volume backup service 112 also includes a storage array monitoring module 116 configured to determine parameters and characteristics of the storage arrays 106 providing the underlying storage volumes for the given virtual volume. The virtual volume backup service 112 further includes a storage volume backup selection module 118 configured to analyze such parameters to determine which underlying storage volume to be protected.

At least portions of the functionality of the virtual volume configuration analysis module 114, the storage array monitoring module 116 and the storage volume backup selection module 118 may be implemented at least in part in the form of software that is stored in memory and executed by a processor.

Although shown as external to the host devices 102 and storage arrays 106 in the FIG. 1 embodiment, it should be appreciated that the virtual volume backup service 112 in other embodiments may be implemented at least in part internal to one or more of the host devices 102 and/or one or more of the storage arrays 106 (e.g., such as on the storage controllers 110 of storage array 106-1).

The host devices 102, storage arrays 106 and virtual volume backup service 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102, the storage arrays 106 and virtual volume backup service 112 may be implemented on respective distinct processing platforms, although numerous other arrangements are possible. For example, in some embodiments at least portions of one or more of the host devices 102, the storage arrays 106 and the virtual volume backup service 112 are implemented on the same processing platform. The virtual volume backup service 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 in some embodiments may be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the virtual volume backup service 112 may be implemented at least in part in the first geographic location, the second geographic location, and one or more other geographic locations. Thus, it is possible in some implementations of the system 100 for different ones of the host devices 102, the storage arrays 106 and the virtual volume backup service 112 to reside in different data centers.

Numerous other distributed implementations of the host devices 102, the storage array 106 and the virtual volume backup service 112 are possible. Accordingly, the host devices 102, the storage array 106 and the virtual volume backup service 112 can also be implemented in a distributed manner across multiple data centers.

Additional examples of processing platforms utilized to implement portions of the system 100 in illustrative embodiments will be described in more detail below in conjunction with FIGS. 11 and 12.

It is to be understood that the particular set of elements shown in FIG. 1 for generating recommendations for protection operations performed for virtual storage volumes is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for generating recommendations for protection operations performed for virtual storage volumes will now be described in more detail with reference to the flow diagram of FIG. 2. It is to be understood that this particular process is only an example, and that additional or alternative processes for generating recommendations for protection operations performed for virtual storage volumes may be used in other embodiments.

In this embodiment, the process includes steps 200 through 206. These steps are assumed to be performed by the virtual volume backup service 112 utilizing the virtual volume configuration analysis module 114, the storage array monitoring module 116 and the storage volume backup selection module 118. The process begins with step 200, identifying a protection operation to be performed for a virtual storage volume. The virtual storage volume comprises two or more storage volumes on two or more storage systems, a first one of the two or more storage volumes on a first one of the two or more storage systems comprising data that is mirrored on a second one of the two or more storage volumes on a second one of the two or more storage systems different than the first storage system. The virtual storage volume may comprise a distributed redundant array of disks (RAID) device, such as a distributed RAID 1 (DR1) device comprising first and second storage clusters each comprising at least one storage volume of the virtual storage volume that mirrors the same data.

In step 202, one or more parameters characterizing operation of the two or more storage systems are monitored. Step 202 may comprise analyzing a configuration of the virtual storage volume to map the virtual storage volume to the two or more storage systems providing the two or more storage volumes. Mapping the virtual storage volume to the two or more storage systems providing the two or more storage volumes may comprise: utilizing a first application programming interface (API), which takes as input an identifier of the virtual storage volume, to obtain extent information for supporting devices associated with the virtual storage volume; utilizing a second API, which takes as input the extent information for a given one of the supporting devices, to obtain a list of one or more of the two or more storage volumes of the virtual storage volume that are provided by the given supporting device; and utilizing a third API, which takes as input an identifier of a given one of the storage volumes in the list that are provided by the given supporting device, to obtain an identifier of one of the two or more storage systems that provides the given storage volume. Utilizing the first API, the second API and the third API may comprise utilizing respective get representational state transfer (REST) calls.

The one or more parameters characterizing operation of the two or more storage systems may comprise at least one parameter characterizing health of the two or more storage systems providing the two or more storage volumes, such as load information for the two or more storage systems. The one or more parameters characterizing operation of the two or more storage systems may also or alternatively comprise at least one parameter characterizing performance of the two or more storage systems providing the two or more storage volumes, such as at least one of current input-output operations per second, latency and bandwidth information for the two or more storage systems. The one or more parameters characterizing operation of the two or more storage systems may further or alternatively comprise at least one parameter characterizing free capacity of the two or more storage systems providing the two or more storage volumes, such as deduplication ratio information for the two or more storage systems. The one or more parameters characterizing operation of the two or more storage systems may further or alternatively comprise at least one parameter characterizing recent alerts and errors encountered on the two or more storage systems providing the two or more storage volumes, such as at least one of temperature state information and input-output operation timeout information for the two or more storage systems.

Figure 2:
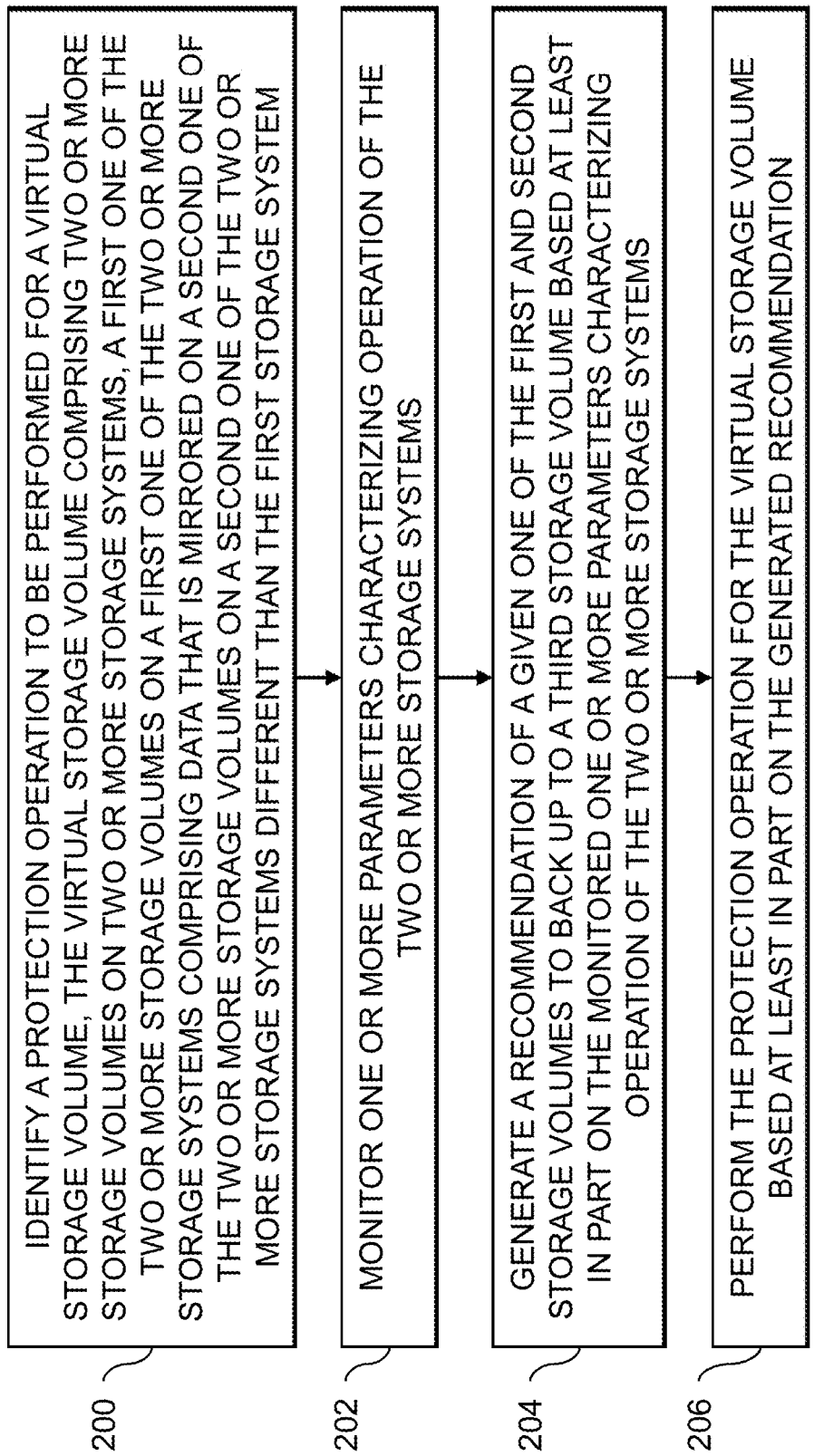
FIG. 2 is a flow diagram of an exemplary process for generating recommendations for protection operations performed for virtual storage volumes in an illustrative embodiment.

The FIG. 2 process continues with step 204, generating a recommendation of a given one of the first and second storage volumes to back up to a third storage volume based at least in part on the monitored one or more parameters characterizing operation of the two or more storage systems. The protection operation for the storage volume is performed in step 206 based at least in part on the generated recommendation. In some embodiments, step 206 includes backing up the given one of the first and second storage volumes to the third storage volume (e.g., automatically performing the protection operation in accordance with the generated recommendation). In other embodiments, step 206 may include providing an alert to a user associated with the virtual storage volume, the alert comprising a user interface feature permitting the user to accept or reject the generated recommendation of the given one of the first and second storage volumes to back up to the third storage volume.

Virtual storage technology, such as that offered by Dell EMC VPLEX, enables federation of data located on multiple storage systems including storage systems in different data centers or different geographic locations. The virtual storage technology, for example, may be used to pool resources from multiple storage systems together to create storage virtual volumes (also referred to herein as virtual volumes or VVols). To provide redundancy in the case of planned and unplanned storage system outage, virtual storage technology such as VPLEX supports the ability to mirror data of virtual volumes between storage volumes on different storage systems. This may be achieved in some cases using a Redundant Array of Independent Disks (RAID) configuration.

Critical data, for example, may be mirrored on two or more storage volumes provided by separate storage arrays or storage systems in a RAID 1 device configuration. In such a configuration, the virtual volume is mirrored between two storage arrays or other storage systems, referred to as "legs" of the virtual volume. If one of the storage arrays or storage systems experiences an outage, the virtual storage technology can continue processing input-output (IO) operations on the surviving leg (e.g., the storage array or storage system that has not experienced failure). When the failed leg is restored, the virtual storage technology synchronizes data from the surviving leg to the restored leg.

There is a need for backup software or other functionality that provides dynamic load balancing options while protecting virtual volumes. Conventional techniques, for example, require an end user to specify which leg(s) need to be protected for a virtual volume (e.g., including distributed virtual volumes such as a Distributed RAID 1 (DR1) virtual volume) before running protection operations. In other words, conventional techniques have static settings and the backup software will always try to protect only the leg specified by the end user. If, however, the statically specified leg is not in an appropriate state for copy this can lead to inconsistent copy and required Service Level Agreements (SLAs) may not be met leading to business impact. Illustrative embodiments provide a backup solution for virtual volumes that allows the end user to let the backup software decide which leg to protect automatically based on certain parameters thus ensuring that the required SLAs are met without manual intervention.

Various embodiments will be described below with respect to a virtual volume implemented using VPLEX, but it should be appreciated that the techniques described may be used in various other types of virtual storage technology, including virtual volumes provided by a Dell EMC ViPR controller, etc.

In some embodiments, the virtual volume backup service 112 determines at runtime which leg of a virtual volume should be protected based on various parameters. Such parameters may include, but are not limited to, space constraints, IO loads, connectivity, hardware failure, etc. of the underlying storage arrays 106 (or other storage systems) providing the storage volumes for the virtual volume. Advantageously, this will reduce the time spent by backup or storage administrators to go back and check the health of the backend storage arrays or storage systems to determine the exact issue that the backup software faced.

Figure 3:
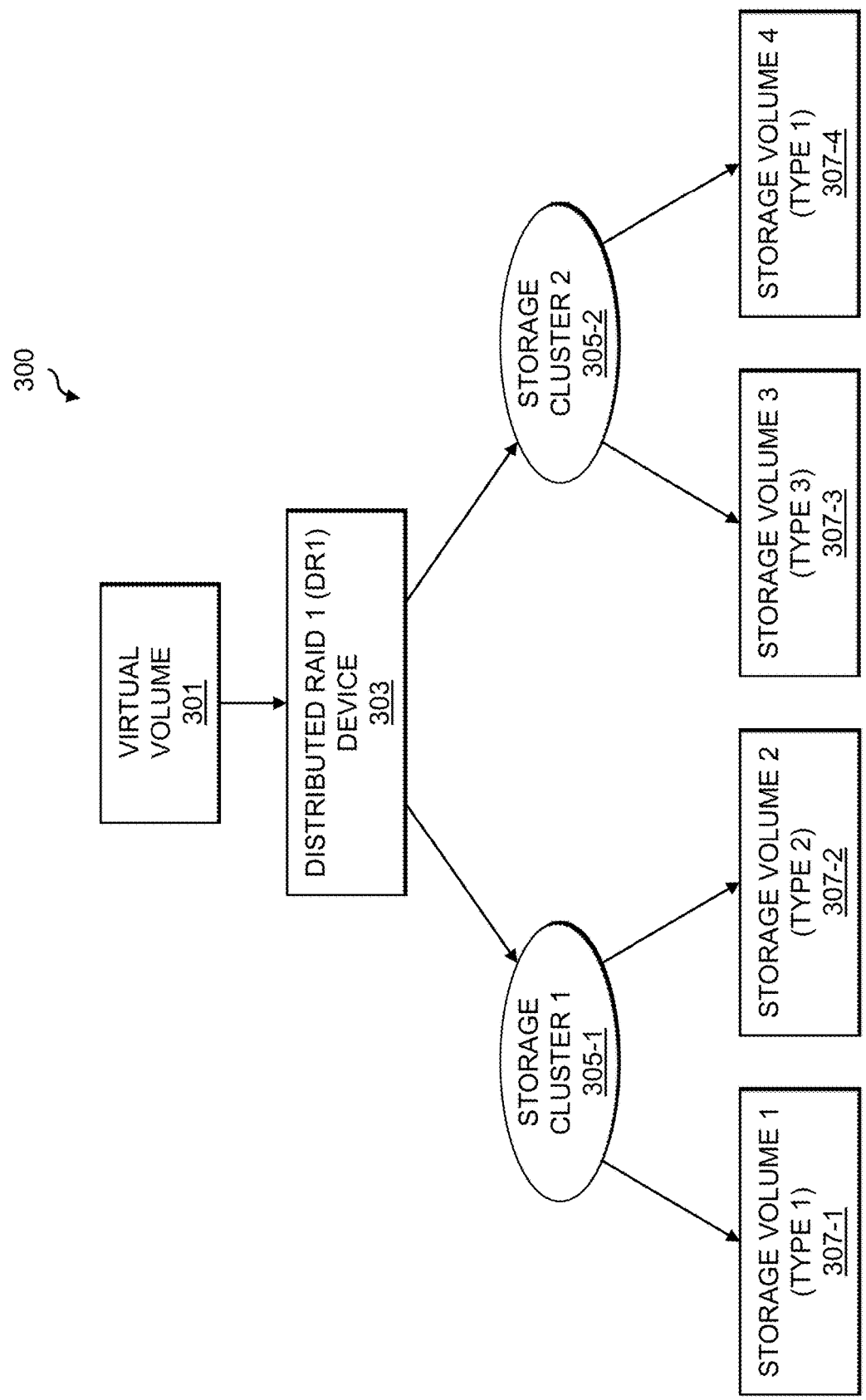
FIG. 3 shows an example configuration of a virtual volume in an illustrative embodiment.

FIG. 3 shows an example configuration 300 of a virtual volume 300. In the FIG. 3 example, the virtual volume 301 is implemented utilizing a distributed RAID 1 (DR1) device 303 that includes a first storage cluster 305-1 and a second storage cluster 305-2 (collectively, storage clusters 305). Each of the first storage cluster 305-1 and the second storage cluster 305-2 utilizes two underlying storage volumes of two different types provided by different storage arrays or storage systems. More particularly, the first storage cluster 305-1 utilizes storage volume 307-1 of type 1 and storage volume 307-2 of type 2, while the second storage cluster 305-2 utilizes storage volume 307-3 of type 3 and storage volume 307-4 of type 1. As an example, the virtual volume 301 may be a VPLEX virtual volume, while the storage volume 307-1 is a VMAX (V1) volume provided by a VMAX storage array, the storage volume 307-2 is an XtremIO (X1) volume provided by an XtremIO storage array, the storage volume 307-3 is a Unity (U1) volume provided by a Unity storage array, and the storage volume 307-4 is also a VMAX storage array (V1) provided by the VMAX storage array (e.g., in this instance, the storage volumes 307-1 and 307-4 are provided by the same underlying storage array). The storage volume 307-1 may be referred to as leg 1 ($L1_{C_1}$) of the first storage cluster 305-1 while the storage volume 307-2 is referred to as leg 2 ($L2_{C_1}$) of the first storage cluster 305-1. The storage volume 307-3 may be referred to as leg 1 ($L1_{C_2}$) of the second storage cluster 305-2 while the storage volume 307-4 is referred to as leg 2 ($L2_{C_2}$) of the second storage cluster 305-2. As in this example the virtual volume 301 is implemented using a DR1 device 303, the same data is mirrored across storage volumes 307-1, 307-2, 307-3 and 307-4 (collectively, storage volumes 307).

Consider a scenario where a storage administrator seeks to protect leg $L1_{C_1}$ residing on the VMAX storage array VMAX V1 at the first storage cluster 305-1. At run time, the virtual volume backup service 112 is configured to determine the health of the V1 storage array. More specifically, assume that the V1 storage array is in poor health (e.g., due to space constraints, connectivity issues, IO overload, etc.) as determined using application programming interfaces (APIs) exposed by the V1 storage array. Examples of such APIs will be discussed in further detail below. In this instance, the virtual volume backup service 112 is configured to select a different storage volume to protect, such as $L2_{C_1}$ at the first storage cluster 305-1 or $L1_{C_2}$ as the second storage cluster 305-2 (but not $L2_{C_2}$ at storage cluster 305-2, because $L2_{C_2}$ in this example is from the same V1 storage array experiencing poor health). This assumes that the $L2_{C_1}$ at the first storage cluster 305-1 and $L1_{C_2}$ at the second storage cluster 305-2 are up and running in a healthy state (or at least a healthier state than $L1_{C_1}$ at the first storage cluster 305-1). In some embodiments, the virtual volume backup service 112 automatically switches to protecting $L2_{C_1}$ at the first storage cluster 305-1 or $L1_{C_2}$ at the second storage cluster 305-2. In other embodiments, the virtual volume backup service 112 may send an alert or notification to a storage administrator or other authorized user (e.g., associated with one of the host devices 102 or another client device) with a recommendation for the storage volume to protect. The storage administrator or other authorized user can then approve or reject the recommendation as desired. It should be appreciated that the virtual volume backup service 112 may run a check each time a copy or protect operation is to be performed, or may use historical data to select the storage volume without running a check each time. For example, the virtual volume 301 may have protect or backup operations scheduled to run each hour. In such an example, the virtual volume backup service 112 may run a check once every X hours (e.g., where X>1) and use historical data for selecting the storage volume to protect in between such checks.

As discussed above, various parameters may be used to decide which leg to be protected for a virtual volume. Such parameters may be obtained using various APIs exposed by the underlying storage arrays or storage systems providing storage volumes for the virtual volume. Examples of such APIs, and processes for consuming information from those APIs in order to decide which leg is optimal to be protected, will now be described. APIs for mapping a VPLEX virtual volume to underlying storage will now be described.

Figure 4:
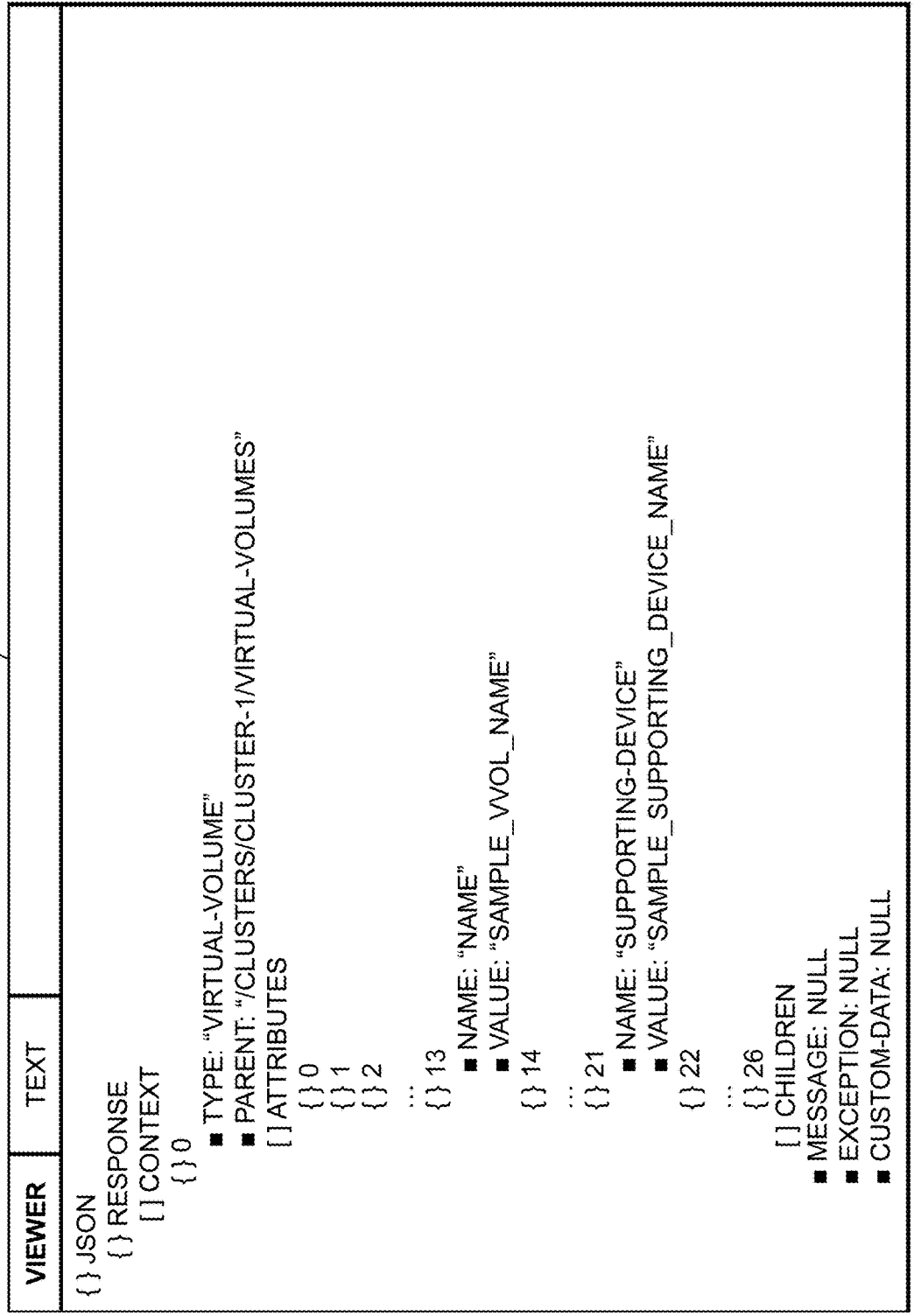
FIG. 4 shows an example of extent information for a virtual storage volume in an illustrative embodiment.

In the description below, assume that the virtual volume comprises VPLEX virtual volume (VVol) with a VVol name of "Sample_VVol_Name." FIG. 4 illustrates the extent information (e.g., supporting device information) returned from invoking an API using a CALL GET command (e.g., https://lrmr20l/vplex/clusters/cluster-1/virtual-volumes/Sample_VVol_Name) to return a JavaScript Object Notation (JSON) response 400.

Figure 5:
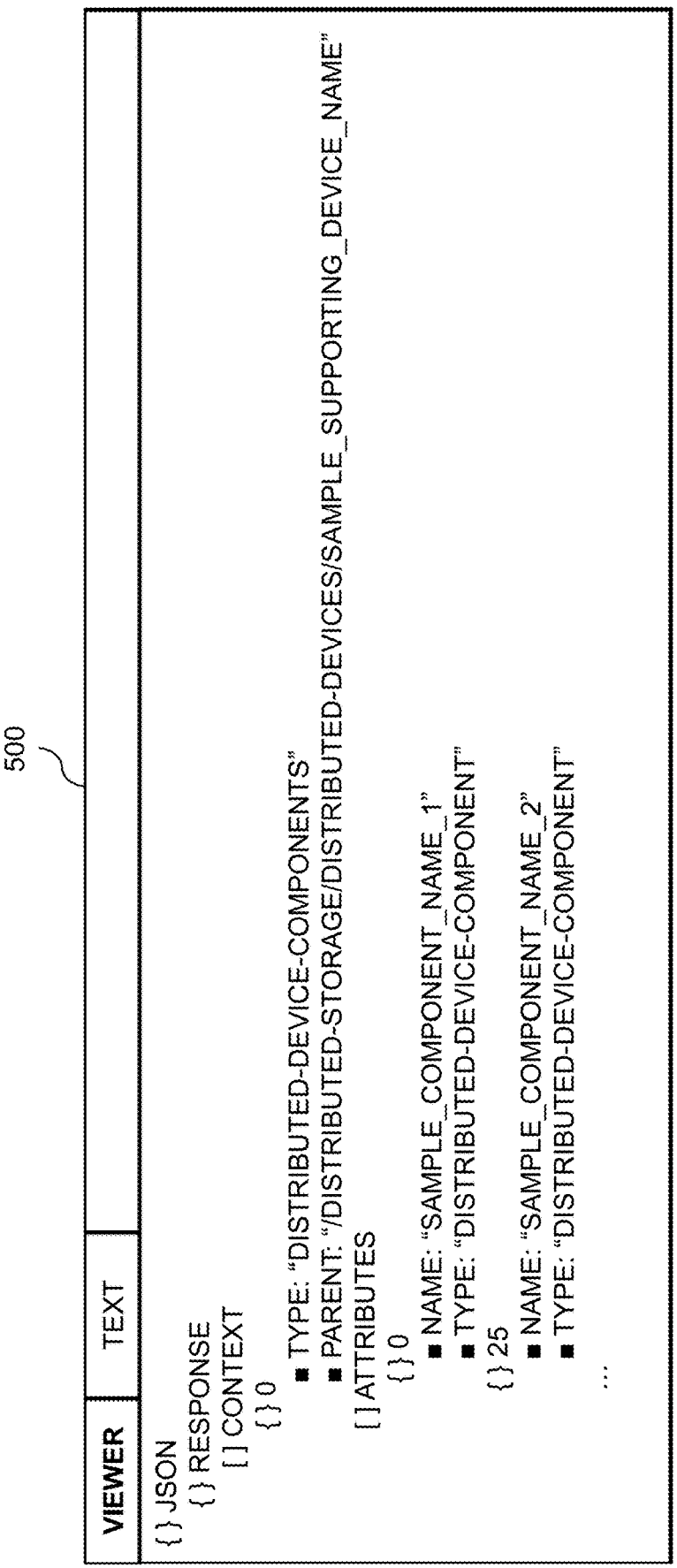
FIG. 5 shows an example of leg information for a virtual storage volume in an illustrative embodiment.
Figure 6:
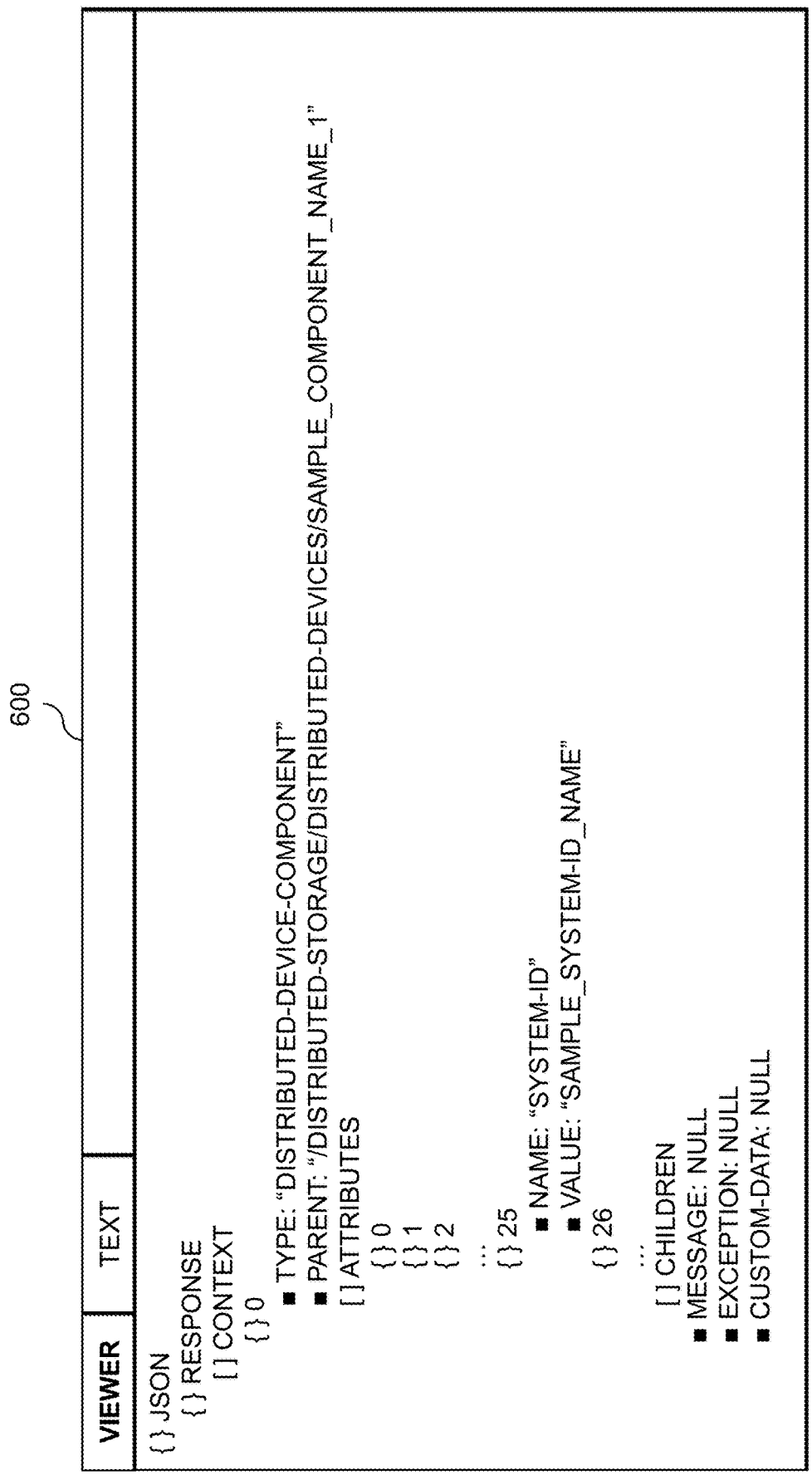
FIG. 6 shows an example of storage system information for legs of a virtual storage volume in an illustrative embodiment.

FIG. 5 illustrates the legs of the storage array using the supported device, as retrieved using a Representational State Transfer (REST) API call (e.g., GET https://lrmr20l/vplex/distributed-storage/distributed-devices/Sample_Supporting_Device_Name/distributed-device-components/) in a JSON response 500. In this example, there are two legs on the "Sample_VVol_Supporting_Device_Name" site. The storage information for both devices is then retrieved using another REST API call (e.g., GET https://lrmr20l/vplex/distributed-storage/distributed-devices/Sample_Supporting_Device_Name/distributed-device-components/Sample_Component_Name_1") as shown in FIG. 6. This gives the array information in a JSON response 600. In this example, the calls at the VPLEX level are done, and information on the storage arrays utilized by the sample virtual volume are added to the virtual volume backup service 112.

Figure 7:
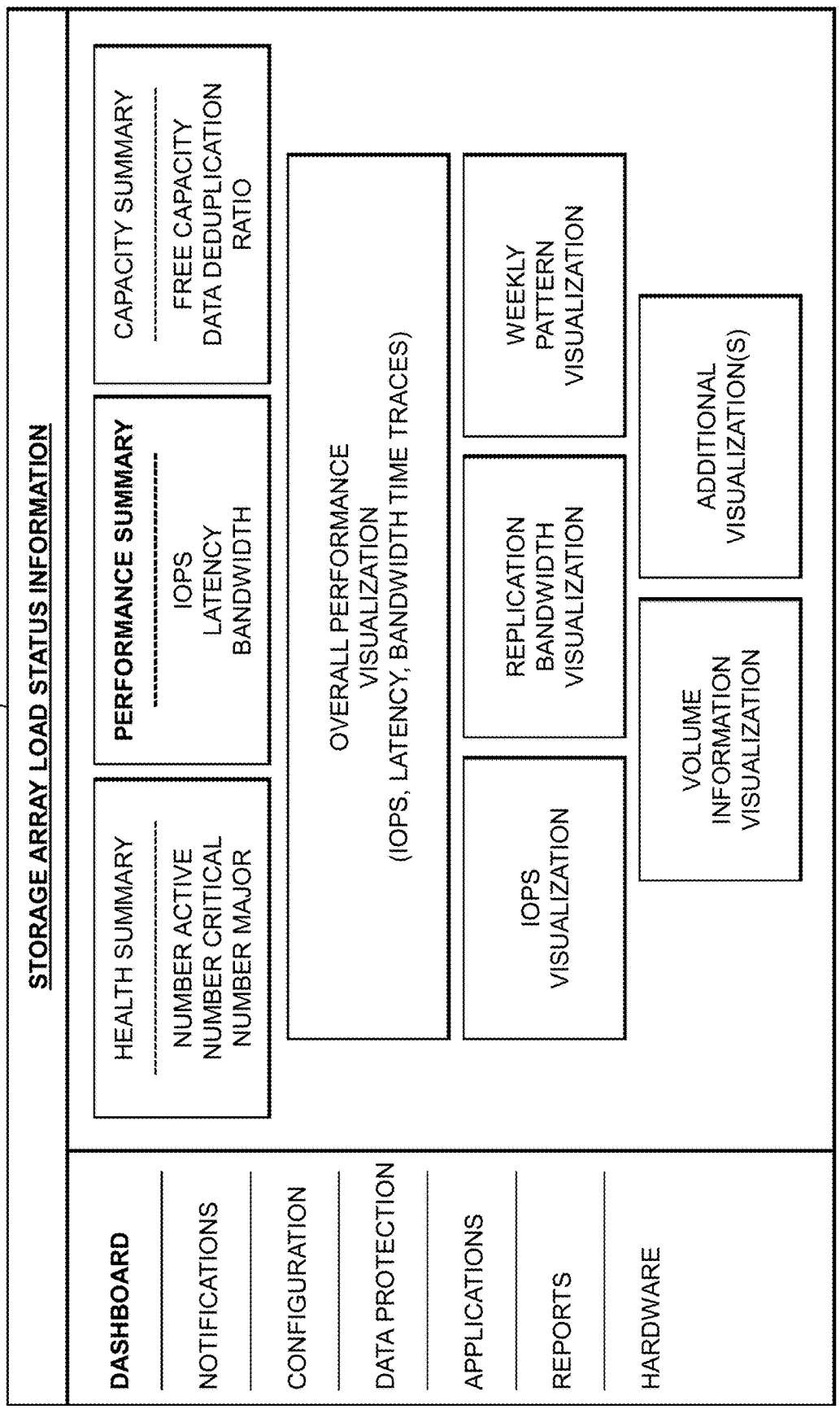
FIG. 7 shows an example of storage array load status information in an illustrative embodiment.
Figure 8:
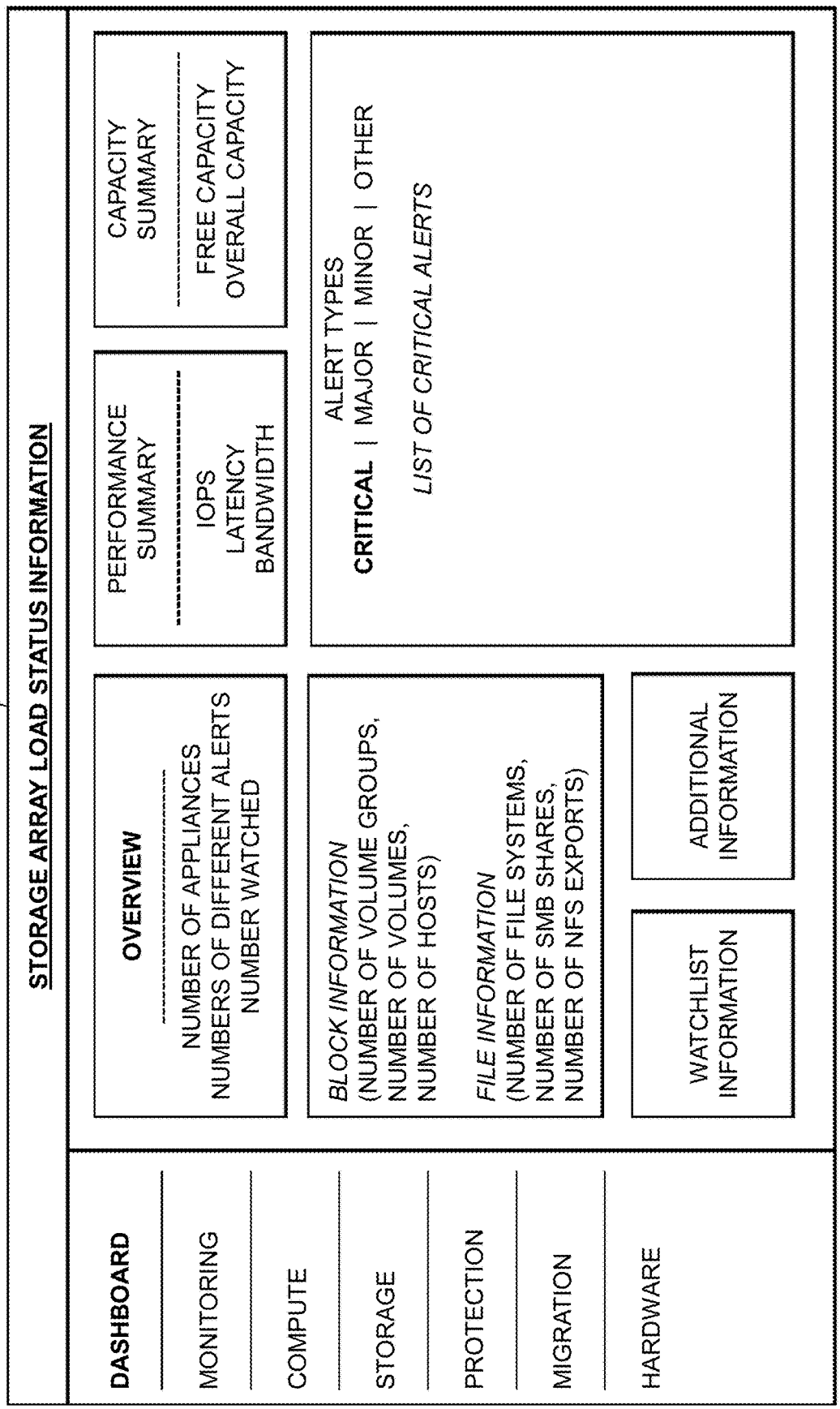
FIG. 8 shows another example of storage array load status information in an illustrative embodiment.

Parameters for the storage arrays providing storage volumes for the virtual volume are then determined. Such parameters may include, for example, load on a storage array's storage volume. The parameters are obtained to dynamically determine whether a particular storage volume is an optimal leg of the virtual volume to be protected. Consider, as an example, two possible storage volumes that reside on XtremIO and PowerStore storage arrays. XtremIO and PowerStore are examples of storage arrays which provide rich APIs allowing the virtual volume backup service to get current status information. FIGS. 7 and 8 show example screenshots 700 and 800, respectively, of storage array load status information obtained from different storage arrays, such as XtremIO and PowerStore storage arrays. As illustrated, the particular arrangement or layout of information and visualizations in the screenshots 700 and 800 may vary, as different storage arrays may provide or expose different information via their associated APIs.

Figure 10:
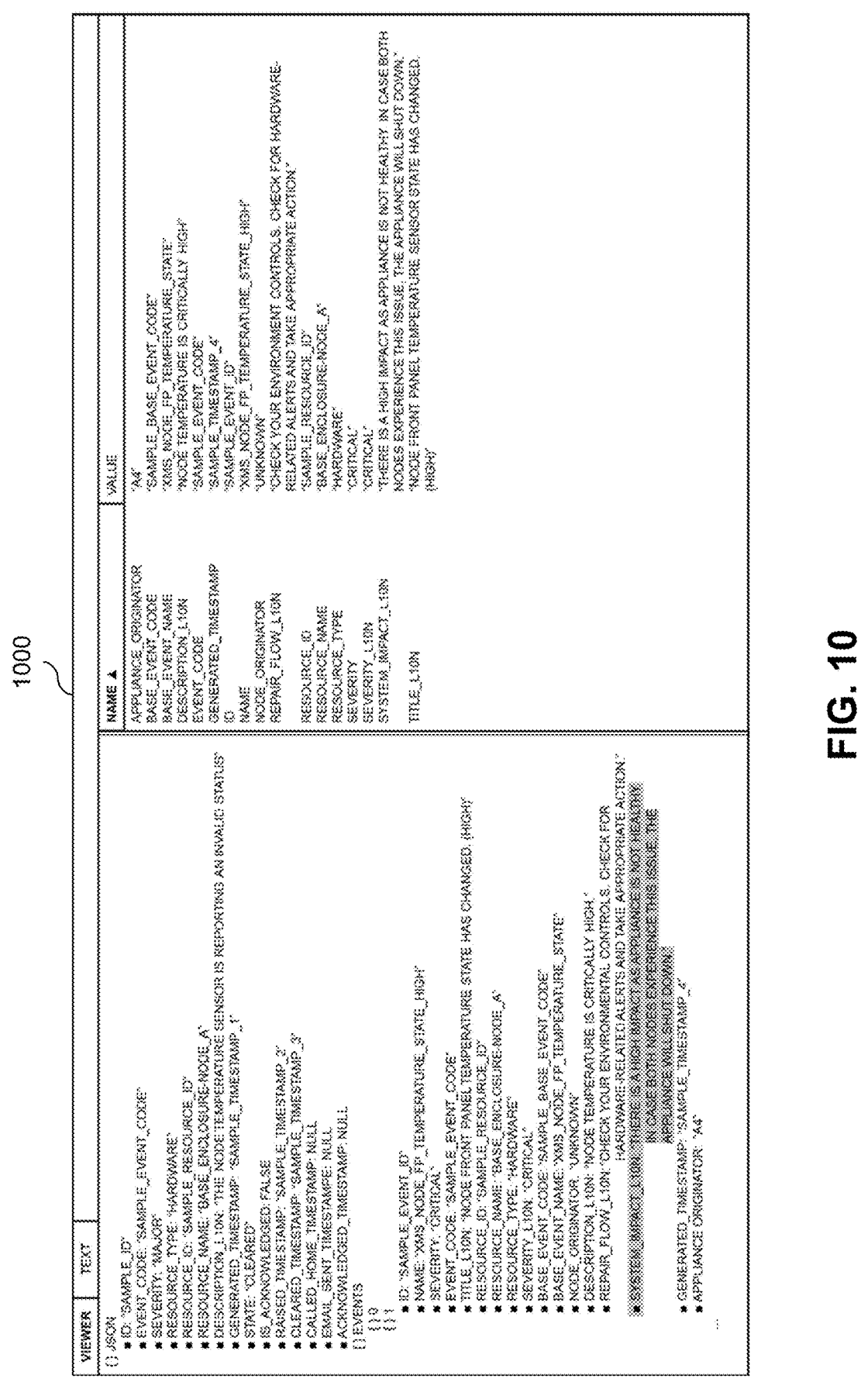

The virtual volume backup service 112 will also obtain parameters such as: the health of the storage arrays providing storage volumes for a virtual volume; performance (e.g., current IOPS, latency, bandwidth, etc.); free capacity (e.g., possible including deduplication ratio); recent alerts and errors (e.g., at a storage array level); etc. Obtaining such information from APIs provided by XtremIO and PowerStore storage arrays will now be described. FIG. 9 shows an example output 900 from the XtremIO storage array (e.g., as obtained using a GET command https://losar053.lss.emc.com:443/api/json/v2/types/performance?entity=Volume&entity-name=Sample_XIO_Storage_Volume). FIG. 10 shows an example output 1000 from the PowerStore storage array (e.g., as obtained using a GET command https://10.247.32.78/api/rest/alert/008a19cd-fbc4-4a7e-ad36-5dbe1367c447?select=*).

The virtual volume backup service 112 uses the obtained parameters (e.g., storage array health, performance, free capacity, recent alerts and errors) to determine which leg of the virtual volume is most optimal at a given point in time to be protected. It should be noted that embodiments are not limited to using the four parameters (e.g., storage array health, performance, free capacity, recent alerts and errors) described above. The virtual volume backup service 112 may utilize various other parameters in addition to or in place of one or more of these parameters. In the examples shown in FIGS. 9 and 10, the PowerStore storage array is not in a healthy state because of high temperature, and thus the XtremIO storage array is the leg that will be protected.

Illustrative embodiments provide a number of advantages relative to conventional techniques which statically or manually select a storage volume to copy or protect for virtual volumes. The virtual volume backup service 112 provides a completely automated solution, and thus storage administrators will not be required to manually monitor the state of legs of virtual volumes. The storage administrator will also be informed of issues associated with legs of the virtual volumes and can take appropriate corrective measures accordingly. Further, storage administrators will not miss SLAs of a backup job due to issues of static or manually assigned legs being in poor health, assuming that there is at least one leg in an appropriate state for protection.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generating recommendations for protection operations performed for virtual storage volumes will now be described in greater detail with reference to FIGS. 11 and 12. Although described in the context of system 100, these platforms may also be used to implement at least portions of other information processing systems in other embodiments.

Figure 11:
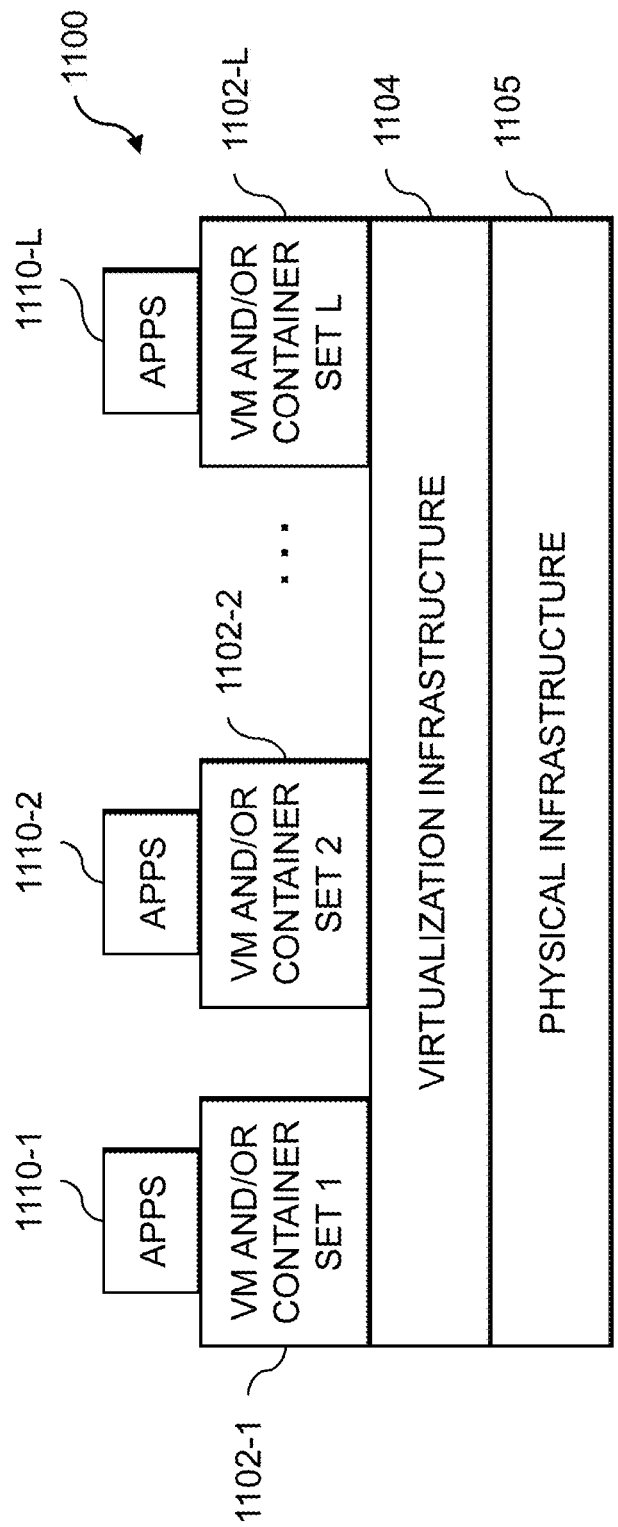
FIGS. 11 and 12 show examples of processing platforms that may be utilized to implement at least a portion of an information processing system in illustrative embodiments.
Figure 12:
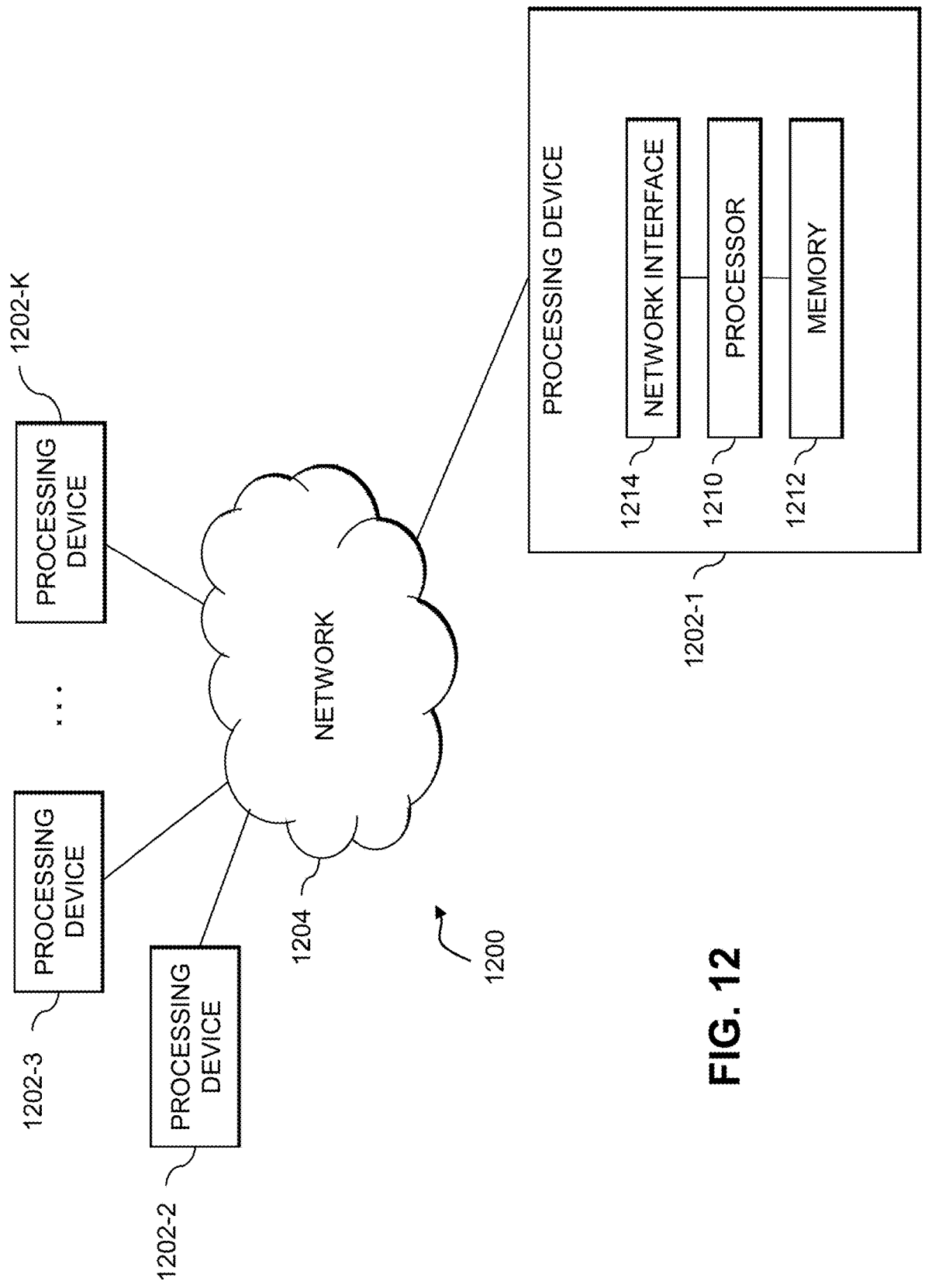

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generating recommendations for protection operations performed for virtual storage volumes as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, virtual storage volume configurations, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured to perform steps of:

identifying a protection operation to be performed for a virtual storage volume, the virtual storage volume comprising two or more storage volumes on two or more storage systems, a first one of the two or more storage volumes on a first one of the two or more storage systems comprising data that is mirrored on a second one of the two or more storage volumes on a second one of the two or more storage systems, the second storage system being a different type of storage system than the first storage system, the protection operation comprising backing up at least a portion of the data that is mirrored on the first and second ones of the two or more storage volumes to a third storage volume;

monitoring one or more parameters characterizing operation of the two or more storage systems;

generating a recommendation of a given one of the first and second storage volumes to utilize for the protection operation based at least in part on the monitored one or more parameters characterizing operation of the two or more storage systems; and performing the protection operation for the virtual storage volume based at least in part on the generated recommendation.

2. The apparatus of claim 1 wherein the virtual storage volume comprises a distributed redundant array of disks (RAID) device.

3. The apparatus of claim 2 wherein the distributed RAID device comprises a distributed RAID 1 (DR1) device comprising first and second storage clusters each comprising at least one storage volume of the virtual storage volume that mirrors the same data.

4. The apparatus of claim 3 wherein the first storage cluster comprises the first and second storage volumes, wherein the second storage cluster comprises third and fourth ones of the two or more storage volumes, and wherein at least one of the third and fourth storage volumes is stored on one of the first and second storage systems.

5. The apparatus of claim 1 wherein performing the protection operation for the virtual storage volume based at least in part on the generated recommendation comprises providing an alert to a user associated with the virtual storage volume, the alert comprising a user interface feature permitting the user to accept or reject the generated recommendation of the given one of the first and second storage volumes to to utilize for the protection operation.

6. The apparatus of claim 1 monitoring the one or more parameters characterizing the operation of the two or more storage systems comprises analyzing a configuration of the virtual storage volume to map the virtual storage volume to the two or more storage systems providing the two or more storage volumes.

7. The apparatus of claim 6 wherein mapping the virtual storage volume to the two or more storage systems providing the two or more storage volumes comprises:
  utilizing a first application programming interface, which takes as input an identifier of the virtual storage volume, to obtain extent information for supporting devices associated with the virtual storage volume;
  utilizing a second application programming interface, which takes as input the extent information for a given one of the supporting devices, to obtain a list of one or more of the two or more storage volumes of the virtual storage volume that are provided by the given supporting device; and
  utilizing a third application programming interface, which takes as input an identifier of a given one of the storage volumes in the list that are provided by the given supporting device, to obtain an identifier of one of the two or more storage systems that provides the given storage volume.

8. The apparatus of claim 7 wherein utilizing the first application programming interface, the second application programming interface and the third application programming interface comprise respective get representational state transfer calls.

9. The apparatus of claim 1 wherein the one or more parameters characterizing operation of the two or more storage systems comprise at least one parameter characterizing health of the two or more storage systems providing the two or more storage volumes.

10. The apparatus of claim 9 wherein the at least one parameter characterizing the health of the two or more storage systems providing the two or more storage volumes comprises load information for the two or more storage systems.

11. The apparatus of claim 1 wherein the one or more parameters characterizing operation of the two or more storage systems comprise at least one parameter characterizing performance of the two or more storage systems providing the two or more storage volumes.

12. The apparatus of claim 11 wherein the at least one parameter characterizing the performance of the two or more storage systems providing the two or more storage volumes comprises at least one of current input-output operations per second, latency and bandwidth information for the two or more storage systems.

13. The apparatus of claim 1 wherein the one or more parameters characterizing operation of the two or more storage systems comprise at least one parameter characterizing free capacity of the two or more storage systems providing the two or more storage volumes.

14. The apparatus of claim 13 wherein the at least one parameter characterizing the free capacity of the two or more storage systems providing the two or more storage volumes comprises deduplication ratio information for the two or more storage systems.

15. The apparatus of claim 1 wherein the one or more parameters characterizing operation of the two or more storage systems comprise at least one parameter characterizing recent alerts and errors encountered on the two or more storage systems providing the two or more storage volumes.

16. The apparatus of claim 15 wherein the at least one parameter characterizing the recent alerts and errors encountered on the two or more storage systems providing the two or more storage volumes comprises at least one of temperature state information and input-output operation timeout information for the two or more storage systems.

17. A computer program product comprising a non-transitory processor-readable storage medium having stored therein program code of one or more software programs, wherein the program code when executed by at least one processing device causes the at least one processing device to perform steps of:
  identifying a protection operation to be performed for a virtual storage volume, the virtual storage volume comprising two or more storage volumes on two or more storage systems, a first one of the two or more storage volumes on a first one of the two or more storage systems comprising data that is mirrored on a second one of the two or more storage volumes on a second one of the two or more storage systems, the second storage system being a different type of storage system than the first storage system, the protection operation comprising backing up at least a portion of the data that is mirrored on the first and second ones of the two or more storage volumes to a third storage volume;
  monitoring one or more parameters characterizing operation of the two or more storage systems;
  generating a recommendation of a given one of the first and second storage volumes to utilize for the protection operation based at least in part on the monitored one or more parameters characterizing operation of the two or more storage systems; and
  performing the protection operation for the virtual storage volume based at least in part on the generated recommendation.

18. The computer program product of claim 17 wherein the one or more parameters characterizing operation of the two or more storage systems comprise two or more of:
  at least one parameter characterizing health of the two or more storage systems providing the two or more storage volumes;
  at least one parameter characterizing performance of the two or more storage systems providing the two or more storage volumes;
  at least one parameter characterizing free capacity of the two or more storage systems providing the two or more storage volumes; and at least one parameter characterizing recent alerts and errors encountered on the two or more storage systems providing the two or more storage volumes.

19. A method comprising:

identifying a protection operation to be performed for a virtual storage volume, the virtual storage volume comprising two or more storage volumes on two or more storage systems, a first one of the two or more storage volumes on a first one of the two or more storage systems comprising data that is mirrored on a second one of the two or more storage volumes on a second one of the two or more storage systems, the second storage system being a different type of storage system than the first storage system, the protection operation comprising backing up at least a portion of the data that is mirrored on the first and second ones of the two or more storage volumes to a third storage volume;

monitoring one or more parameters characterizing operation of the two or more storage systems;

generating a recommendation of a given one of the first and second storage volumes to utilize for the protection operation based at least in part on the monitored one or more parameters characterizing operation of the two or more storage systems; and performing the protection operation for the virtual storage volume based at least in part on the generated recommendation;

wherein the method is performed by at least one processing device comprising a processor coupled to a memory.

20. The method of claim 19 wherein the one or more parameters characterizing operation of the two or more storage systems comprise two or more of:

at least one parameter characterizing health of the two or more storage systems providing the two or more storage volumes;

at least one parameter characterizing performance of the two or more storage systems providing the two or more storage volumes;

at least one parameter characterizing free capacity of the two or more storage systems providing the two or more storage volumes; and at least one parameter characterizing recent alerts and errors encountered on the two or more storage systems providing the two or more storage volumes.

* * * * *